United States Patent [19]

Emi et al.

[11] 4,296,163

[45] Oct. 20, 1981

[54] FIBROUS COMPOSITE HAVING ELASTICITY

[75] Inventors: Shingo Emi; Noritsugu Saiki, both of Iwakuni, Japan

[73] Assignee: Teijin Limited, Osaka, Japan

[21] Appl. No.: 59,238

[22] Filed: Jul. 20, 1979

[30] Foreign Application Priority Data

Aug. 1, 1978 [JP] Japan ................................. 53-93094
Jan. 16, 1979 [JP] Japan ................................. 54-2165

[51] Int. Cl.$^3$ ............................................ B32B 7/02
[52] U.S. Cl. .................................... 428/212; 428/219; 428/220; 428/247; 428/284; 428/287; 428/296; 428/297; 428/298; 428/300; 428/303; 428/218
[58] Field of Search ............... 428/131, 134, 137, 138, 428/195, 198, 230, 231, 227, 296, 297, 298, 299, 300, 303, 360, 364, 280, 369, 480, 218, 213, 219, 220, 247, 284, 289, 212

[56] References Cited

U.S. PATENT DOCUMENTS

| | | | |
|---|---|---|---|
| 3,117,055 | 1/1964 | Guandique et al. | 428/360 |
| 3,565,745 | 2/1971 | Weber et al. | 428/300 |
| 3,620,897 | 11/1971 | Tanimoto et al. | 428/360 |
| 3,954,928 | 5/1976 | Omori et al. | 428/105 |
| 4,037,010 | 7/1977 | Keller et al. | 428/360 |
| 4,209,563 | 6/1980 | Sisson | 428/288 |

*Primary Examiner*—James J. Bell
*Attorney, Agent, or Firm*—Sherman & Shalloway

[57] ABSTRACT

A fibrous composite comprising a coalesced assembly of (A) a sheet-like mesh structure composed of fibers of a synthetic elastomeric polymer, the individual fibers being interconnected at random in irregular spaced-apart relationship thereby forming a number of meshes of different shapes and sizes, said mesh structure having a recovery ratio after 10% stretch of at least 70% in two arbitrarily selected, mutually perpendicular directions on the plane of said mesh structure, and (B) a mat-, web- or sheet-like fibrous structure composed of short or long fibers, said fibrous structure having a recovery ratio after 10% stretch of less than 50% in at least one arbitrarily selected direction. An elastic fibrous composite of this invention is suitable as various apparel base materials and industrial materials such as filter clothes, adsorbents, and heat insulating materials.

10 Claims, No Drawings

FIBROUS COMPOSITE HAVING ELASTICITY

This invention relates to a fibrous composite having elasticity. More specifically, this invention relates to a fibrous composite having elasticity comprising (A) a sheet-like mesh structure having elasticity in biaxial direction and (B) a mat-, web- or sheet-like fibrous structure composed of an assembly of short or long fibers and having no, or only a low degree of, elasticity, said structurwes (A) and (B) being coalesced with each other.

One known type of nonwoven products having elasticity is a sheet sliced from a polyurethane foam. The sheet, however, is required to have a thickness larger than a certain limit, and cannot be obtained in a small thickness. Hence, the sheet-like product of polyurethane foam has poor drape, a low initial stress per unit thickness and is not satisfactory as an elastic sheet.

There has also been known in the past a composite composed of a sliced sheet-like material of polyurethane foam and a batt or mat of short fibers which are coalesced with each other by needle punching or with the use of an adhesive. However, this composite has the defect that its drape is poor; it has an undesirable feeling inherent to polyurethane foam; and the polyurethane sheet-like material turns yellow with time.

A knitted or woven fabric of Spandex fibers has also been known as an elastic sheet-like material. Such a fabric, however, is very costly because the manufacturing process for it is complicated. It is furthermore difficult to produce this material in a small thickness.

It is also known to produce an elastic nonwoven fabric by impregnating a rubber binder in a known conventional nonwoven fabric or a nonwoven fabric of fibers from an elastomeric polymer. The resulting nonwoven fabric, however, has poor air permeability. To increase elastic recovery, it is necessary to use large amounts of rubber, and this inevitably leads to the defect that the initial stress of the product is too high.

A method for producing an elastic batt or mat is also known which involves impregnating a batt or mat of natural or synthetic short fibers with a synthetic latex and thus fixing the interconnected points of the fibers by means of the latex. Because of the use of the latex, the resulting batt or mat has a hard hand, and an insufficient elastic recovery ratio, and is never satisfactory in practical application.

It is an object of this invention therefore to provide a fibrous composite which has suitable levels of tensile strength, initial modulus and elastic recovery, superior air permeability, drape and dimensional stability, and good hand and warmth retention.

Another object of this invention is to provide an elastic fibrous composite which as a result of having the aforesaid properties, is suitable as various apparel base materials such as base cloths, interlining cloths, wound dressings, supporters, foundations and felts, and industrial materials such as filter cloths, adsorbents, sound absorbers, heat insulating materials, and indoor building materials.

Other objects and advantages of this invention will become apparent from the following description.

According to this invention, these objects and advantages are achieved by a fibrous composite comprising a coalesced assembly of (A) a sheet-like mesh structure composed of fibers of a synthetic elastomeric polymer, the individual fibers being interconnected at random in irregular spaced-apart relationship, thereby forming a number of meshes of different shapes and sizes, said mesh structure having a recovery ratio after 10% stretch of at least 70% in two arbitrarily selected, mutually perpendicular directions on the plane of said mesh structure, and (B) a mat-, web- or sheet-like fibrous structure composed of short or long fibers, said fibrous structure having a recovery ratio after 10% stretch of less than 50% in at least one arbitrarily selected direction.

The definition "having a recovery ratio after 10% stretch of less than 50% given hereinabove with regard to the mat-, web- or sheet-like structure (B) is meant also to include a structure having a recovery ratio of substantially zero after 10% stretch, and a structure which is broken or permanently deformed upon stretching by less than 10%, and cannot be stretched by 10%. A structure which can be stretched by 10% but requires a stress larger than the stress required to stretch the sheet-like mesh structure (A) by 10% in a certain direction is not suitable as the mat-, web- or sheet-like structure (B).

The fibrous composite of the invention is described in detail hereinbelow.

SHEET-LIKE MESH STRUCTURE

The sheet-like mesh structure (A), as one constituent element of the composite of this invention, is an assembly of many fibers of a synthetic elastomeric polymer. The individual fibers in the assembly are interconnected at random in irregular spaced-apart relationship, thereby forming a number of meshes of different shapes and sizes. The "interconnection" of the individual fibers may be in any form. For example, fibers or the synthetic elastomeric polymer forming the fibers is branched, and at least two individual fibers formed as a result of branching are connected to one another before the branching points. Or at least two fibers are interconnected by the tackiness imparted by heat or solvent (when the tackiness is given by a solvent, the solvent is substantially evaporated off after the interconnection of the fibers). Or at least two fibers may be interconnected by a binder composed of a polymer or polymer-forming material which is different from the elastomeric polymer that forms the fibers.

The sheet-like mesh structure (A) used in this invention should be able to be stretched to at least 10% of the original length in one arbitrary direction on the plane of the sheet-like structure and in a direction perpendicular thereto, and when a stress required to stretch it 10% is released, should have a recovery ratio of at least 70%, preferably at least 80%, of the stretch ratio (that is, 10% of the original length). The recovery ratio to the original length after 10% stretch should preferably be as high as possible. An especially preferred sheet-like mesh structure (A) has a recovery ratio of at least 80%, and retains a recovery ratio of at least 80% even after repeating 10% stretch and release of stress at suitable time intervals, for example 10 or more times.

The sheet-like mesh structure (A) should further have a stress of 5 to 1,000 g. especially 10 to 500 g, when it is determined by taking a test specimen, 2.5 cm wide, having a length of 5 cm for examle in an arbitrary direction on the plane of the mesh structure, and stretching the specimen by 10%.

The sheet-like mesh structure (A) also preferably has a weight of 10 to 100 g/m², particularly 15 to 60 g/m².

The sheet-like mesh structure (A) preferably has a fiber density (Fd) of 3 to 100, especially 6 to 30. The fiber density (Fd) is calculated in accordance with the following equation.

$$Fd = \tfrac{1}{2}(a+b) \tag{1}$$

wherein a is the number of fibers which cross a straight line formed by connecting two arbitrary points 2 mm apart from each other on the plane of the sheet-like mesh structure (A), and b is the number of fibers which cross a straight line formed by connecting two artitrary points 2 mm apart from each other on a straight line at right angles to the straight line referred to above with regard to the number of fibers (a).

The number of fibers (a and b) is read from a photograph of the specimen taken through a scanning electron microscope.

The synthetic elastomeric polymer constituting the elastic fibers of the sheet-like mesh structure (A), in its fiber form, should be able to be stretched 10%, and when the stress required for 10% stretch is released, should have a recovery ratio of at least 60%, preferably at least 70%, of the 10% stretch. Suitable synthetic elastomeric polymers used for this purpose are those having a melting point of 80° to 300° C., especially 100° to 250° C., a density of 0.8 to 1.4 g/cm³, especially 1.0 to 1.25 g/cm³, and a Shore hardness, measured in accordance with the testing method of ASTM D-2240, of 30 A to 75 D, especially 30 D to 60 D.

The elasticity recovery (R) of the sheet-like mesh structure is determined at room temperature by an Instron tester on a rectangular test specimen, 2.5 cm in width and 10 cm in length, which is taken from an arbitrary place of the sheet-like mesh structure (A) at room temperature (25° C.). The length of the specimen between chucks at both ends is adjusted, for example, to 5 cm, and the specimen is stretched 10% at a head speed of 5 cm/minute. Immediately then, the stress is released, and in the meanwhile, the specimen is returned at the same speed. The length of the test specimen at a stress of zero (the length between the two chucks) is measured (a mm). The elastic recovery ratio (R) can be calculated in accordance with the following equation (2).

$$\text{Elastic recovery ratio } (R) = \frac{55 - a(mm)}{5mm} \times 100 \, (\%) \tag{2}$$

The elastic recovery ratio of the fibers of the synthetic elastomeric polymer can also be measured in the same way as above.

Preferably, the sheet-like mesh structure (A) has a drape factor (F) determined in accordance with the following equation (3) of not more than 60%, especially not more than 50%.

The drape factor (F) is determined as follows: Three circular test specimens, 25.4 cm in diameter, are taken from the sheet-like mesh structure (A), and are placed on a specimen table, 12.7 cm in diameter, so that the centers of the specimens correspond with the center of the specimen table. The perpendicularly projected area of the specimens at this time is measured, and the drape factor (F) is determined in accordance with the following equation.

$$\text{Drape factor } (F) = \frac{Ad - S_2}{S_2 - S_1} \times 100 \, (\%) \tag{3}$$

wherein
Ad is the perpendicularly projected area (drape profile area) of the test specimens in mm²,
$S_1$ is the area (mm²) of the specimen table, and
$S_2$ is the area (mm²) of the test specimens.

Furthermore, the sheet-lke mesh structure (A) preferably has a drape stiffness, to be defined below, of not more than 3.5 cm, especially not more than 3 cm.

The drape stiffness is measured in accordance with the 45° Cantilever Method stipulated in JIS (Japanese Industrial Standard) L1005. A specific procedure is as follows: A sample, 25×150 mm, is taken from the sheet-like mesh structure, and is placed on a smooth horizontal table having a 45° inclined surface at its pointed end and a scale at its top surface so that the shorter side (25 mm) of the specimen matches the base line of the scale. Then, the sample is pushed slowly toward the inclined surface, and when the forward end of the specimen contacts the inclined surface, the position of the other end of the sample is read by the scale and the pushed length (cm) of the sample is measured. The pushed length of the specimen is defined as drape stiffness.

The sheet-like mesh structure (A) used in this invention is preferably produced by the so-called burst method (to be referred to as the BF method) which comprises extruding a melt of the synthetic elastomeric polymer and a blowing agent through a slit die, and immediately after the extrusion, taking up the extrudate while drafting it at a draft ratio of at least 10, preferably at least 20, and cooling it. The sheet-like mesh structure (A) may also be a mesh structure having a basis weight of 10 to 100 g/m² which is produced by spreading or extending the sheet-like mesh structure produced by the BF method in direction at right angles to the extruding direction, laminating at least 10, preferably 20 to 500, such structures, and if desired, hot-pressing the laminated structure to bond the individual structures to one another. Details of the manufacturing methods are described below.

A sheet-like mesh structure having a basis weight of 10 to 100 g/m² obtained by the spun-bond method to be described hereinbelow can also be used conveniently a the sheet-like mesh structure (A).

The elastomeric polymer forming the sheet-like mesh structure (A) in this invention preferably has a melting point of 80° to 300° C., especially 100° to 250° C., and may include, for example, polyester elastomers, polyurethane elastomers, and polyolefin elastomers. Specific examples of these elastomers are described below, but the elastomeric polymer used in this invention is not limited to these specific examples.

(a) Polyester elastomers

Suitable polyester elastomers are those consisting of polyesters having a high melting point and a high crystallinity as a hard segment and aliphatic polyesters or aliphatic polyesters having a second order transition point of not more than 0° C. and a low boiling point as a soft segment. In these polyester elastomers, the ratio of the hard segment to soft segment is 80–10:20–90, preferably 70–30:30–70, % by weight.

Examples of suitable hard segments are polyethylene terephthalate, polypropylene terephthalate, polytetramethylene terephthalate, polyhexamethylene terephthalate, polycyclohexanedimethylene terephthalate, polyethylene-2,6-naphthalenedicarboxylate, polytetramethylene-2,6-naphthalenedicarboxylate, and polyhexamethylene-2,6-naphthalenedicarboxylate. Up to 50 mole%, preferably up to 30 mole%, of these ester units may be replaced by a copolymerizing ester unit such as ethylene isophthalate, propylene isophthalate, ethylene orthophthalate, propylene ortho-phthalate, ethylene-2,7-naphthalenedicarboxylate, or propylene-2,7-naphthalenedicarboxylate.

Examples of the soft segment are aliphatic polyethers having a carbon/oxygen ratio of from 1.8/1 to 4.5/1 (e.g., polyethylene glycol, or polytetramethylene glycol); polyesters formed between aliphatic dicarboxylic acids having 4 to 12 carbon atoms such as adipic acid, sebacic acid, azelaic acid or decanedicarboxylic acid and aliphatic glycols having 2 to 12 carbon atoms such as ethylene glycol, tetramethylene glycol, hexamethylene glycol, octamethylene glycol and decamethylene glycol; and polyesters resulting from the self-condensation of aliphatic hydroxycarboxylic acids having 4 to 12 carbon atoms such as epsilon-hydroxycarboxylic acid.

Especially preferred polyester elastomers are those composed of a hard segment of an aromatic polyester having a tetramethylene terephthalate unit as a main recurring unit and a soft segment of an aliphatic polyether having a carbon/oxygen ratio of 2.0/1 to 4.5/1 or an aliphatic polyester. The aromatic polyester of the hard segment may contain 2 to 50 mole% of an ester unit other than tetramethylene terephthalate. The ester unit may be an ester unit derived from a dicarboxylic acid, for example an aliphatic dicarboxylic acid containing 6 to 12 carbon atoms such as terephthalic acid, isophthalic acid, ortho-phthalic acid, methyl terephthalic acid or methyl isophthalic acid and a dihydroxy compound such as ethylene glycol, propylene glycol, tetramethylene glycol, hexamethylene glycol, 2,2'-bis(-hydroxyethoxyphenyl) methane and bisphenols; or an ester unit formed by the self-condensation of a hydroxycarboxylic acid such as epsilon-hydroxycaproic acid or hydroxyethoxybenzoic acid.

(b) Polyurethane elastomers

General polyurethanes, especially those for Spandex fibers. Typical examples are polyurethane obtained by the reaction of compounds containing at least two active hydrogens such as polyesters or polyethers with polyisocyanates.

Suitable polyesters for the formation of these polyurethanes are those produced by reacting at least one dicarboxylic acid component, for example a saturated aliphatic dicarboxylic acid such as oxalic acid, succinic acid, glutaric acid, adipic acid, pimelic acid, azelaic acid and sebacic acid, unsaturated aliphatic dicarboxylic acids such as maleic acid and fumaric acid or an aromatic dicarboxylic acid such as phthalic acid or isophthalic acid, with a polyol to be described below. Examples of the polyol are diols such as ethylene glycol, diethylene glycol, triethylene glycol, propylene glycol and butylene glycol, triols such as trimethylol propane, trimethylol ethane, hexane triol and glycerol, and hexanols such as sorbitol. In addition to the polyesters derived from the various acids and polyols described above, self-condensation polyesters of intramolecular esters such as caprolactone can equally be used. Polyesters derived from adipic acid and ethylene glycol and/or diethylene glycol are preferred.

Suitable polyethers that can be reacted with polyisocyanates are those obtained by the ring-opening polymerization of at least one cyclic ether such as ethylene oxide, propylene oxide, trimethylene oxide, butylene oxide, tetrahydrofuran and dioxane. Of these, polypropylene glycol, polyethylene glycol, polytetramethylene glycol and copolymers thereof are especially preferred.

Examples of suitable polyisocyanates to be used to form polyurethanes by reaction with the aforesaid polyesters or polyethers include tolylene diisocyanate, 3,3'-bitolylene-4,4'-diisocyanate, diphenylmethane diisocyanate, and 3,3'-dimethyldiphenylmethane-4,4'-diisocyanate.

(c) Polyolefin elastomers

Examples are block copolymer of ethylene and propylene, and copolymers obtained by reacting the block copolymer with diene compounds such as cyclopentadiene, cyclohexadiene, butadiene and isoprene. A copolymer of styrene and butadiene, and a copolymer of styrene and isoprene can also be used.

The aforesaid polyester elastomers (a), polyurethane elastomers (b), and polyolefin elastomers (c) are merely illustrative, and any other elastic polymers which can be formed into the sheet-like mesh structure (A) of this invention can be used as the synthetic elastomeric polymer in the present invention.

The aforesaid elastomeric polymers can be used alone or in combination with one another. Among the polymers (a) to (c), the polyester elastomers, (a) are especially suitable for the production of the sheet-like mesh structure of this invention because they have relatively high melting points and do not turn yellow under light.

The above elastomeric polymer may contain up to 20% by weight, preferably up to 15% by weight, based on the entire polymer, of another polymer which shows no elasticity, and in some cases, this is preferred. Examples of the other polymer to be mixed with the elastomeric polymer are polyethylene, polypropylene, polystyrene, polyesters, polyamides and polycarbonates.

If desired, the above elastomeric polymer may be subjected to a treatment of partial crosslinking at any desired stage. The treatment may be performed by generally used methods, for example by methods involving the irradiation of ultraviolet light, electron beams, ionizing radiation, microwaves, etc., or by treating with ozones or radical generators such as peroxides. These methods can be employed either alone or in combination with each other. At this time, a second component which is sensitive to the crosslinking treatment may be blended or copolymerized with the elastomeric polymer. The method of blending or copolymerization for this purpose is well known.

The elastomeric polymer forming the sheet-like mesh structure of this invention may include additives generally used for synthetic polymers, such as fire retardants, coloring agents, stabilizers, ultraviolet absorbers, crystallization promotors, and delusterants.

Some examples of the manufacturing process for the sheet-like mesh structure (A) of this invention are described below.

(1) BF method

One preferred method for producing the sheet-like mesh structure (A) used in the present invention is a so-called BF method which comprises extruding a foamable synthetic elastomeric polymer in the molten state from an elongated slit die having a clearance of, say, not more than 1.5 mm using an extruder, and taking up the extrudate while quenching it with a cooling medium such as air and water. A method similar to it is described in U.S. Pat. No. 3,954,928.

The resulting sheet having a mesh structure is spread in the transverse direction of the sheet as described in detail hereinbelow. A plurality of, preferably at least 10, such spread sheets are laminated to obtain the sheet-like mesh structure of this invention.

In the BF method, an I-shaped slit die, T-shaped slit die, and a circular slit die can be used. The foamable synthetic elastomeric polymer is extruded in the molten state from the slit. The elastomeric polymer can be melted by heating it to a suitable temperature of, for example, 100° to 350° C., preferably 150° to 300° C. Advantageously, the melting temperature is such that the viscosity of the elastomeric polymer at the exit of the slit die is 100 to 10,000 poises, preferably 300 to 3,000 poises.

In the BF method, the slit die through which the foamable elastomeric polymer is extruded in the molten state has a clearance of 0.02 to 1.5 mm, preferably 0.03 to 0.5 mm. To obtain a mesh structure having a fine denier size, the clearance of the slit is desirably not more than 0.2 mm.

The blowing agent to be included in the elastomeric polymer may be those which evolve gases when the molten elastomeric polymer is extruded from the slit exit. It includes not only gaseous blowing agents, but also solid or liquid substances which generate gases by decomposition or reaction upon contact with the molten elastomeric polymer.

Foaming can be performed in various ways such as the following.

(i) A normally gaseous substance such as nitrogen gas, carbon dioxide gas, helium, propane, or butane is kneaded with the molten elastomeric polymer.

(ii) A substance which is liquid at room temperature but becomes gaseous at the melting temperature of the elastomeric polymer, such as water, is kneaded with the molten elastomeric polymer.

(iii) A substance which generates a gas upon decomposition, such as a diazo compound (e.g., azodicarbonamide or p-toluenesulfonyl semicarbamide), or sodium carbonate is kneaded with the elastomeric polymer.

(iv) A high-molecular-weight polymer which generates a gas upon reaction with a part of the molten elastomeric polymer (polyester), such as polycarbonate, is mixed with the elastomeric polymer.

Among these methods, the method involving the use of nitrogen gas is especially advantageous because it is economical and does not cause the oxidation of the polymer.

In any of these methods, a gas should be generated from the die together with the polymer when the elastomeric polymer is extruded in the molten state from the slit die. It is preferred that the blowing substance should be mixed as uniformly as possible with the molten elastomeric polymer and be dispersed as uniformly as possible. If the dispersion of the blowing agent is not good, it is difficult to obtain a uniform mesh structure.

Advantageously, the blowing agent is used in an amount such that the volume of a gas generated from it at the time of extruding the molten elastomeric polymer from the exit of the slit die is 10 to 100 ml, preferably 15 to 60 ml, (NTP) per kilogram of the elastomeric polymer. It is commercially advantageous to use a gaseous blowing agent, and in this case, it is desirably kneaded under a pressure of 20 to 100 kg/cm$^2$ with the molten elastomeric polymer.

As stated hereinabove, the molten elastomeric polymer containing the blowing agent is extruded from an elongated slit die, whereupon the gas dispersed in the polymer escapes to generate foams. The extrudate is quenched at the exit to give a sheet having cracks. When the product is extended, a mesh-like sheet is obtained. Preferably, cooling of the molten polymer at the exit of the slit die is carried out by blowing a gas such as air or steam against the extrudate while drafting it immediately after leaving the slit exit, especially over a short distance from the slit exit to a point 10 mm below it, preferably from the slit exit to a point 5 mm below it so that the molten elastomeric polymer will solidify into a mesh-like fibrous material. The draft ratio is suitably 50 to 250, especially 100 to 200. The draft ratio is defined by the following equation.

$$\text{Draft ratio} = \frac{\text{Speed (cm/min.) of take up of the mesh-like fibrous material}}{\text{Linear speed (cm/min.) of the molten polymer at the slit die exit}}$$

The transverse sectional surface of the individual fibers of the resulting mesh-like sheet formed by the BF method has irregular asymmetrical protrusions and depressions of different profiles and sizes. Furthermore, each individual fiber has such a non-circular cross sectional structure that its cross section is different in profile and size along the fiber axis. The individual fibers forming the mesh-like sheet preferably have an average diameter of 1 to 200 microns, preferably 10 to 100 microns.

A predetermined number (at least 10, preferably 20 to 500, especially preferably 30 to 300) of such mesh-like sheets, either in the unspread state or somewhat extended transversely, are laminated and, extended transversely (in a direction at right angles to the longitudinal direction of the sheet in the unspread state) at an overfeed while both ends thereof are being held. The laminate is then hot-pressed to form a sheet-like mesh structure.

The sheet-like mesh structure obtained by the BF method has a recovery ratio of at least 70%, preferably at least 80%, after 10% stretch in an arbitrary direction and a direction at right angles thereto, and has a stress of 5 to 1000 g, preferably 10 to 500 g, at 10% stretch measured on a test specimen, 2.5 cm wide, taken from the mesh structure in an arbitrary direction.

Advantageously, the sheet-like mesh structure has a weight of 10 to 100 g/m$^2$, preferably 15 to 60 g/m$^2$.

Furthermore, it is preferred that the fibers be interconnected at random in irregular spaced-apart relationship so that the average number of fibers crossing a straight line formed by connecting any two points (2 mm) on the structure is 3 to 100/2 mm, preferably 6 to 30/2 mm, thus forming a number of meshes having different shapes and sizes.

In laminating the elastic sheets obtained by the BF method, a mesh sheet formed from a nonelastomeric polymer may be laminated as part of the structure. For example, a mesh sheet obtained by the BF method from such a nonelastomeric polymer as polypropylene, polyethylene, polystyrene, polyethylene terephthalate, polybutylene terephthalate, nylon 6, nylon 66, or polycarbonate, or a combination of these with one another, or a sheet of parallelized long fibers can also be laminated as a part of the structure. The sheet of parallelized long fibers denotes a sheet in which the long fibers are aligned substantially in the machine direction and are partly entangled or coalesced with one another. The long fibers may be those generally used, for example long fibers of a polyester such as polyethylene terephthalate or polybutylene terephthalate, a polyamide such as nylon 6 or nylon 66, a polyolefin such as polypropylene or polyethylene, polyurethane, a vinyl polymer, acetate, rayon, either alone or in combination with one another.

(2) Spun-bond method

The sheet-like mesh structure (A) in accordance with this invention may be obtained from the elastomeric polymer by a so-called spun-bond method or spin-bond method. A basic process for the production of a mesh non-woven fabric by the spun-bond method is described in detail, for example in U.S. Pat. No. 3,117,055.

Briefly stated, the spun-bond method comprises spinning a melt of the synthetic elastomeric polymer simultaneously from a plurality of fine nozzles, conducting the resulting continuous filaments to an endless belt placed below the spinneret to form a uniform web in which the filaments are aligned in all directions and partly bonded and coalesced with one another. A more uniform and stable nonwoven fabric may be produced by subjecting the resulting nonwoven fabric to a binder treatment or heat bonding treatment to strengthen the coalescing of the filaments with one another.

By the spun-bond method, a uniform sheet-like material having a relatively small fiber diameter can be obtained. The fiber diameter is preferably 0.5 to 200 microns, especially 2 to 100 microns.

While the production of the sheet-like mesh structure (A) has been described hereinabove with particular reference to the BF method and the spun-bond method, it should be understood that other methods can also be used in this invention if they will afford sheet-like mesh structures (A) having the aforesaid characteristics.

MAT-, WEB- OR SHEET-LIKE FIBROUS STRUCTURE (B)

The mat-, web- or sheet-like fibrous structure (B) to be coalesced with the sheet-like mesh structure (A) may be an assembly of short fibers or an assembly of long fibers. The assembly of short fibers is preferred.

Examples of such fibers are long or short fibers of polyesters such as polyethylene terephthalate, polyamides such as nylon 6 and nylon 66, polyolefins such as polyethylene, polypropylene, or an ethylene/propylene random- or block-copolymer, polyurethane, vinyl polymers, acetate, and rayon, short fibers of cotton or wool, and natural fibers such as glass fibers and asbestos fibers.

The aforesaid fibers, especially organic fibers such as polyester or polyamide fibers, may be flat, or properly crimped.

Fibrous structures of these fibers assembled in the form of a mat, web or sheet which will be broken or permanently deformed when stretched by 10% or less of the original dimension, or which can be stretched by up to 10% of the original dimension but have an elastic recovery ratio of less than 50% of the stretch ratio (10%) can be used as the fibrous structure (B) in this invention.

The present invention is characterized by the fact that a composite generally having elasticity is obtained by coalescing the mat-, web- or sheet-like fibrous structure (B) having substantially no elasticity or having only a low degree of elasticity with the aforesaid sheet-like mesh structure (A).

Preferred fibrous structures (B) are those which are in the form of an assembly of fibers which are not woven nor knitted, and have a bulk density (apparent specific gravity) of not more than 0.7, especially 0.005 to 0.5, an individual fiber size of not more than 30 denier, especially not more than 15 denier, above all not more than 10 denier, a thickness of 0.5 to 50 mm, especially 1 to 20 mm, and such a flexibility that under a load of 20 g/cm$^2$, the thickness of the structure decreases by at least 30%, especially at least 40%. When crimped fibers are used as the constituent fibers, they preferably have not more than b 500 crimps per inch, especially not more than 250 crimps per inch. When short fibers are used at the constituent fibers, they preferably have a length of 10 to 50 mm, especially 25 to 100 mm.

Furthermore, the fibrous structure (B) may be a mat-, web- or sheet-like fibrous assembly of a blend of short fibers with a suitable proportion of long fibers as a reinforcing material.

A mat-, web- or sheet-like fibrous assembly composed mainly of crimped short fibers is especially preferred.

The constituent fibers of the fibrous structure (B) may be partly bonded to one another at the coalescing points of the fibers by heat fusion, or the tackiness of the constituent polymer caused by a solvent, or by using a suitable binder.

According to this invention, not only an apparel base material having a soft hand, high bulkiness, and superior warmth retention, dimensional stability, drape and air permeability, but also a building or industrial material having superior absorption, sound absorption, and heat insulation can be provided by coalescing the mat-, web- or sheet-like fibrous structure (B) composed of short fibers, especially crimped short fibers with the sheet-like mesh structure (A).

COALESCING METHOD

In the present invention, the sheet-like mesh structure (A) can be coalesced with the mat-, web- or sheet-like fibrous structure (B) by a mechanical method or a method using an adhesive to form a composite.

The mechanical coalescing method may include needle punching, stitching, and felting. The needle-punching method is preferred because it is easy to operate, and does not impair the bulkiness, hand, drape, etc. of the composite of this invention. In the needle-punching method, the suitable density of needles is 10 to 1,000/cm$^2$, especially 15 to 500/cm$^2$.

Bonding by using an adhesive is carried out, for example, by interposing heat-fusible fibers between the sheet-like mesh structure (A) and the mat-, web- or sheet-like fibrous structure (B), and heating the assembly to bond the structures (A) and (B) to each other; or by spraying or coating a suitable adhesive or its organic solvent solution on at least one surface of the structures (A) and (B) to bond them to each other.

According to the present invention described in detail hereinabove, the thickness of the sheet-like mesh structure (A) can be made very thin, and by bonding it to the fibrous structure (B), a composite having superior drape, air permeability, elasticity recovery and initial stress can be obtained. Since the composite of this invention has very good dimensional stability, warmth retention and hand, it is very useful as a base cloth of apparel garments, or an interlining cloth or pad of garments having stretchability.

The following Examples illustrate the present invention in more detail. All parts in these Examples are by weight. It should be understood that the invention is not limited to these specific examples alone.

EXAMPLE 1

(1) Production of a sheet-like mesh structure by the BF method

A block polyester having a reduced viscosity of 2.1 was prepared from 175 parts (90 mole%) of dimethyl terephthalate, 19 parts (10 mole%) of dimethyl isophthalate, 180 parts of tetramethylene glycol, and 350 parts of polytetramethylene glycol (molecular weight about 1,950) by ester-interchange in the presence of titanium tetrabutoxide as a catalyst and subsequent polymerization. Three parts of Irganox 1035 ® (a product of Ciba-Geigy) was added before and after the extrusion of polymer, and the mixture was stirred, taken out and formed into chips. The resulting polyester elastomer was dried at 140° C. for 2 hours, and blended with 1% by weight of solid powdery talc. After they were thoroughly mixed, the mixture was put into a hopper of a vent-type extruder. The temperature of the vent-type extruder was adjusted to 220° to 280° C. From the vent portion, nitrogen gas under a pressure of 45 kg/cm$^2$ was introduced so that its proportion was 0.1% by weight based on the polymer. The mixture was extruded while maintaining the temperature of the upper portion of the die at 280° C. and the temperature of the lower portion of the die at 230° C. The slit clearance of the die was 0.1 mm. The polymer which left the slit was wound up at a draft ratio of 100 while it was cooled by blowing air against it at a position 2 to 5 mm away from the tip of the slit. Thus, cracked sheets were obtained.

Seventy-two cracked sheets were laminated, and the laminated structure was extended to 10 times at an overfeed ratio of 2, pressed under a linear pressure of 10 kg/cm by hot press rollers at 105° C., heat set at 140° C. for 20 seconds under tension, and then wound up on a paper cylinder.

(2) Production of a composite

A web (weight, 90 g/m$^2$) of short fibers of polyethylene terephthalate (PET for short) having a fiber length of 51 mm and a single fiber denier size of 1.5 denier and containing 12 crimps per inch was laminated to the sheet-like mesh structure (A) produced as in (1) above. The laminated structure was needle-punched at a needle density of 20/cm$^2$ to form a composite. The properties of the product are shown in Table 1.

EXAMPLES 2 TO 4

In each run, a composite having elasticity was obtained by operating in the same way as in Example 1 except that the type of the elastomeric polymer was changed as shown in Table 1. The properties of the products are shown in Table 1.

The polyester elastomers "Hytrel 4056 ®" and "Hytrel 5556 ®" are trademarks for products of E. I. du Pont de Nemours & Co., and the polyurethane elastomer "ROYLAR E-85 ®" is a trademark for a product of Uniroyal Company.

EXAMPLE 5

(1) Production of a sheet-like mesh structure by the spun-bond method

A sheet-like mesh structure was produced in accordance with Example 1 of U.S. Pat. No. 3,117,055 assigned to E. I. du Pont de Nemours & Co. A specific procedure was as follows:

"Hytrel 4056 ®" (polyester elastomer) was melted at 270° C., and spun into filaments in an atmosphere held at 25° C. and a relative humidity of 70%. The filaments were extruded by means of a suction jet connected to an electrostatic potential source (commutator generator), and accumulated on a rotating receiver table until a uniform sheet was obtained. The properties of the resulting sheet-like mesh structure are shown in Table 2.

(2) Production of a composite

An elastic composite was produced by the same procedure as in Example 1, (2). The properties of the composite are shown in Table 2.

EXAMPLE 6

A sheet-like mesh structure was produced by the same operation as in Example 1, (1). A web of PET staples was spot-bonded to the resulting sheet-like mesh structure by a print method using a copolymer of ethyl acrylate/butyl acrylate (50/50, % by weight) as an adhesive. The amount of the adhesive applied was 5% by weight. The properties of the resulting composite are shown in Table 2.

EXAMPLE 7

Using a blend of "Hytrel 4056 ®" with 2% by weight of isotactic polypropylene (S-115 M, a product of Ube Industries, Ltd.), the same operation as in Example 1 was performed to obtain a sheet-like mesh structure and a composite. The properties of the products are shown in Table 2.

TABLE 1

| Example | | 1 | | 2 | |
|---|---|---|---|---|---|
| Characteristics of polymer | Polymer | Polyester elastomer | | Hytrel 5556 ® | |
| | Hardness | 38D | | 55D | |
| | Density (g/cm$^3$) | 1.15 | | 1.20 | |
| | Melting point (°C.) | 170 | | 211 | |
| Sheet-like mesh structure (A) | Manufacturing method | BF method | | BF method | |
| | Fiber density (number) | 20 | | 28 | |
| | Elastic recovery ratio | MD | TD | MD | TD |
| | (at 10% stretch) (%) | 85 | 83 | 88 | 84 |
| | Stress (at 10% stretch) | 54 | 60 | 105 | 150 |
| | Drape factor | 40 | | 40 | |
| | Drape stiffness (cm) | 2.0 | | 2.2 | |
| | Thickness (μ) | 70–90 | | 80–95 | |
| | Weight (g/m$^2$) | 27.0 | | 35.0 | |
| Fibrous structure (B) | Material | Web of PET staples | | " | |
| | Single fiber denier | 1.5 | | 1.5 | |
| | Fiber length (mm) | 51 | | 51 | |
| | Number of crimps per inch | 12 | | 12 | |
| | Weight (g/m$^2$) | 90 | | 90 | |
| Method of bonding | Method | Needle-punching | | " | |
| | Needle density per cm$^2$ | 20 | | 20 | |
| | Adhesive | — | | — | |
| | Amount of adhesive (wt. %) | — | | — | |
| Composite | Bulk density (g/cm$^3$) | 0.04 | | 0.04 | |
| | Thickness (μ) | about 3000 | | about 3000 | |
| | Elastic recovery ratio | MD | TD | MD | TD |
| | (at 10% stretch) (%) | 80 | 73 | 80 | 75 |

TABLE 1-continued

|  |  |  |  |  |  |
|---|---|---|---|---|---|
|  | Stress (at 100% stretch) | 60 | 65 | 110 | 170 |
|  | Flexibility (%) |  | 66 |  | 66 |
|  | Air permeation resistance (cm/aq.) (*) |  | 3.1 |  | 3.4 |

| Example |  | 3 | 4 |
|---|---|---|---|
| Characteristics of polymer | Polymer | ROYLAR E-85 ® | Hytrel 4056 ® |
|  | Hardness | 85A | 40D (92A) |
|  | Density (g/cm³) | 1.12 | 1.17 |
|  | Melting point (°C.) | 165 | 168 |
| Sheet-like mesh structure (A) | Manufacturing method | BF method | BF method |
|  | Fiber density (number) | 15 | 18 |
|  | Elastic recovery ratio | MD  TD | MD  TD |
|  | (at 10% stretch) (%) | 91  90 | 90  88 |
|  | Stress (at 10% stretch) | 50  68 | 55  65 |
|  | Drape factor (%) | 37 | 35 |
|  | Drape stiffness (cm) | 1.7 | 1.6 |
|  | Thickness (μ) | 90–110 | 80–100 |
|  | Weight (g/m²) | 32.0 | 31.5 |
| Fibrous structure (B) | Material | Web of PET staples | " |
|  | Single fiber denier | 1.5 | 1.5 |
|  | Fiber length (mm) | 51 | 51 |
|  | Number of crimps per inch | 12 | 12 |
|  | Weight (g/m²) | 90 | 90 |
| Method of bonding | Method | Needle-punching | " |
|  | Needle density per m² | 20 | 20 |
|  | Adhesive | — | — |
|  | Amount of adhesive (wt. %) | — | — |
| Composite | Bulk density (g/cm³) | 0.04 | 0.04 |
|  | Thickness (μ) | about 3000 | about 3000 |
|  | Elastic recovery ratio | MD  TD | MD  TD |
|  | (at 10% stretch) (%) | 85  80 | 85  80 |
|  | Stress (at 10% stretch) | 55  75 | 58  70 |
|  | Flexibility (%) | 66 | 66 |
|  | Air permeation resistance (cm/aq.) (*) | 3.2 | 3.2 |

TABLE 2

| Example |  | 5 | 6 |
|---|---|---|---|
| Characteristics of polymer | Polymer | Hytrel 4056 ® | Hytrel 4056 ® |
|  | Hardness | 40D | 40D |
|  | Density (g/cm³) | 1.17 | 1.17 |
|  | Melting point (°C.) | 168 | 168 |
| Sheet-like mesh structure (A) | Manufacturing method | Spun-bond method | BF method |
|  | Fiber density (number) | 37 | 20 |
|  | Elastic recovery ratio | MD  TD | MD  TD |
|  | (at 10% stretch) (%) | 88  85 | 90  88 |
|  | Stress (at 10% stretch) | 60  100 | 55  65 |
|  | Drape factor | 40 | 35 |
|  | Drape stiffness (cm) | 2.0 | 1.6 |
|  | Thickness (μ) | 300–400 | 80–100 |
|  | Weight (g/m²) | 35.2 | 31.5 |
| Fibrous structure (B) | Material | Web of PET staples | " |
|  | Single fiber denier | 1.5 | 1.5 |
|  | Fiber length (mm) | 51 | 51 |
|  | Number of crimps per inch | 12 | 12 |
|  | Weight (g/m²) | 90 | 90 |
| Method of bonding | Method | Needle-punching | Adhesive print |
|  | Needle density per cm² | 20 | — |
|  | Adhesive | — | Ethyl acrylate/butyl acrylate (50/50) copolymer |
|  | Amount of adhesive (wt. %) | — | 5 |
| Composite | Bulk density (g/cm³) | 0.02 | 0.07 |
|  | Thickness (μ) | about 3500 | about 2500 |
|  | Elastic recovery ratio | MD  TD  MD  TD |  |
|  | (at 10% stretch) (%) | 83  76  80  75 |  |
|  | Stress (at 10% stretch) | 65  115  75  90 |  |
|  | Flexibility (%) | 70 | 50 |
|  | Air permeation resistance (cm/aq.) (*) | 2.0 | 4.5 |

| Example |  | 7 |
|---|---|---|
| Characteristics of polymer | Polymer | (1) Hytrel 4056 ® (2) Isotactic polypropylene (1):(2) = 98:2 |
|  | Hardness | — |
|  | Density (g/cm³) | — |
|  | Melting point (°C.) | — |
| Sheet-like mesh structure (A) | Manufacturing method | BF method |
|  | Fiber density (number) | 29 |
|  | Elastic recovery ratio | MD  TD |
|  | (at 10% stretch) (%) | 85  83 |
|  | Stress (at 10% stretch) | 65  80 |
|  | Drape factor (%) | 41 |
|  | Drape stiffness | 2.1 |
|  | Thickness (μ) | 70–90 |
|  | Weight (g/m²) | 32.0 |
| Fibrous structure (B) | Material | Web of PET staples |
|  | Single fiber denier | 1.5 |
|  | Fiber length (mm) | 51 |
|  | Number of crimps per inch | 12 |
|  | Weight (g/m²) | 90 |
| Method of bonding | Method | Needle-punching |
|  | Needle density per cm² | 20 |
|  | Adhesive | — |
|  | Amount of adhesive (wt. %) | — |
| Composite | Bulk density (g/cm³) | 0.04 |
|  | Thickness (μ) | about 3000 |
|  | Elastic recovery ratio | MD  TD |
|  | (at 10% stretch) (%) | 80  75 |
|  | Stress (at 10% stretch) | 70  90 |
|  | Flexibility (%) | 66 |
|  | Air permeation resistance (cm/aq.) (*) | 3.2 |

(Note)
MD: machine direction;
TD: transverse direction.
*The sample is held in a cylinder with a diameter of 65 mm, and a water column manometer is placed along the sample. Pressurized air at a velocity of 4 m/sec. was sent from one side of the cylinder, and the pressure drop at this time is read on the water column manometer.

EXAMPLE 8

Cracked sheets (A) were produced in the same way as in Example 1, (1) using Hytrel 4056 ® as an elastomeric polymeer. Furthermore, cracked sheets (B) were obtained by the same operation as in Example 1, (1) using 70% by weight of polypropylene 50115 M, a product of Ube Industries, Ltd.) and 30% by weight of nylon 6 (T-100, a product of Teijin Limited).

Sixty-four sheets (A) and 8 sheets (B) were laminated with the sheets (B) as an interlayer. The laminated structure was extended to 10 times at an overfeed rate of 2.0, pressed at a linear pressure of 10 kg/cm with hot press rollers at 105° C., heat-set at 150° C. under tension for 20 seconds, and wound up on a paper cylinder. The resulting sheet was bonded to a web of PET staples by the same operation as in Example 1, (2). The properties are shown in Table 3.

EXAMPLE 9

Cracked sheets (A) were produced by the same operation as in Example 1, (1) using Hytrel 4056 ®l as an elastomeric polymer. Sheets (B) composed of parallelized polyethylene terephthalate filaments were laminated to the cracked sheets so that they were aligned in the order of (A)+(B)+(A) and the amount of the sheets (A) was 75% by weight, and the amount of the sheets (B) was 25% by weight. The laminated structure was extended by the same operation as in Example 1, (1) to form a sheet. A composite was produced by the same operation as in Example 1, (2). The properties of the products are shown in Table 3.

The sheet of parallelized polyethylene terephthalate filaments was produced as follows: Polyethylene terephthalate filaments having a monofilament denier of 6 were parallel-laid so that the total denier size was 1,300,000 denier, and stretched to 4 times. The product was crimped so as to provide 18 crimps per inch, heat-set at 180° C. for 2 minutes, continuously spread, tentered by an arcuate bar to a width of 1.5 m. An emulsion-type adhesive obtained by adding a small amount of an emulsifier to a copolymer of ethyl acrylate/butyl acrylate (50% by weight/50% by weight) was impregnated into the entire surface so that the take-up of the adhesive became 5% by weight. The impregnated product was then dried at 100° C.

COMPARATICE EXAMPLE 1

Polyurethane foam was sliced, and coalesced with a web of polyethylene terephthalate staples by the same operation as in Example 1, (2). The thickness of a base cloth composed of polyurethane foam was about 1.5 mm, and a small thickness was difficult to obtain. The composite obtained had lower drape and drape stiffness than the product of the present invention. The various properties of the product are shown in Table 3.

COMPARATIVE EXAMPLE 2

The same polyester elastomer as used in Example 1 was extruded from a T-die, and cooled with a cooling drum to obtain a film having a thickness of 100 microns. The various properties of the film are shown in Table 3. A web of PET staples was bonded to the film by the same operation as in Example 6. The properties of the composite are shown in Table 3. The film completely lacked air permeability, and the drape and drape stiffness of the film were very poor.

TABLE 3

| Example | | 8 | | 9 | |
|---|---|---|---|---|---|
| Sheet-like mesh structure (A) | Manufacturing method | BF method | | BF method and filament parallelized sheet | |
| | Fiber density (number) | 23 | | 50 | |
| | Elastic recovery ratio | MD | TD | MD | TD |
| | (at 10% stretch) (%) | 88 | 85 | 83 | 80 |
| | Stress (at 10% stretch) | 56 | 82 | 75 | 110 |
| | Drape factor (%) | 37 | | 40 | |
| | Drape stiffness (cm) | 1.7 | | 1.9 | |
| | Thickness (μ) | 80–100 | | 80–100 | |
| | Weight (g/m²) | 32.5 | | 31.5 | |
| Fibrous structure (B) | Material | Web of PET staples | | " | |
| | Single fiber denier | 1.5 | | 1.5 | |
| | Fiber length (mm) | 51 | | 51 | |
| | Number of crimps per inch | 12 | | 12 | |
| | Weight (g/m²) | 90 | | 90 | |
| Method of bonding | Method | Needle-punching | | " | |
| | Needle density per cm² | 20 | | 20 | |
| Composite | Bulk density (g/cm³) | 0.04 | | 0.04 | |
| | Thickness (μ) | about 3000 | | about 3000 | |
| | Elastic recovery ratio | MD | TD | MD | TD |
| | (at 10% stretch) (%) | 83 | 80 | 79 | 74 |
| | Stress (at 10% stretch) | 60 | 85 | 85 | 115 |
| | Flexibility (%) | 66 | | 66 | |
| | Air permeation resistance (cm/aq.) (*) | 3.2 | | 4.0 | |

TABLE 3-continued

| Comparative Example | | 1 | | 2 | |
|---|---|---|---|---|---|
| Sheet-like mesh structure (A) | Manufacturing method | — | | — | |
| | Fiber density (number) | — | | — | |
| | Elastic recovery ratio | MD | TD | MD | TD |
| | (at 10% stretch) (%) | 85 | 80 | 95 | 95 |
| | Stress (at 10% stretch) | 20 | 25 | 580 | 630 |
| | Drape factor (%) | 65 | | 70 | |
| | Drape stiffness (cm) | 4.0 | | 3.7 | |
| | Thickness (μ) | 1500 | | 100 | |
| | Weight (g/m²) | 30 | | 140 | |
| Fibrous structure (B) | Material | Web of PET staples | | " | |
| | Single fiber denier | 1.5 | | 1.5 | |
| | Fiber length (mm) | 51 | | 51 | |
| | Number of crimps per inch | 12 | | 12 | |
| | Weight (g/m²) | 90 | | 90 | |
| Method of bonding | Method | Needle-punching | | Adhesive print | |
| | Needle density per cm² | 20 | | — | |
| | Adhesive | — | | Ethyl acrylate/butyl acrylate (50/50) copolymer | |
| | Amount of adhesive (wt. %) | — | | 5 | |
| Composite | Bulk density (g/cm³) | 0.027 | | 0.08 | |
| | Thickness (μ) | about 4500 | | about 3000 | |
| | Elastic recovery ratio | MD | TD | MD | TD |
| | (at 10% stretch) (%) | 79 | 74 | 90 | 90 |
| | Stress (at 10% stretch) | 25 | 35 | 690 | 800 |
| | Flexibility (%) | 66 | | 66 | |
| | Air permeation resistance (cm/aq.) (*) | 10.1 | | ∞ | |

(Note)
MD: machine direction;
TD: transverse direction.
*See the note in Table 1.

EXAMPLE 10

A sheet-like mesh structure (A) was produced by the same operation as in Example 1, (1) using "Hytrel 4056 ®" as an elastomeric polymer. Three hundred cracked sheet structures of polypropylene (average monofilament denier=1 denier) produced by the BF method were laminated, and extended to 10 times at an overfeed rate of 2 to obtain a filament web (B) having a basis weight of 60 g/m² and a thickness of about 10 mm. The mesh structure (A) and the fibrous web (B) were bonded by needle-punching at a needle density of 20/cm² to form a composite.

The composite had the following properties.
(1) Bulk density: 0.01 g/cm³
(2) Thickness: 5000 microns
(3) Elastic recovery ratio: 70% (MD), 65% (TD)
(4) Stress: 85 (MD), 103 (TD)
(5) Flexibility: 55%
(6) Air permeability resistance: 5.8 cm/aq.

EXAMPLES 11 to 14

In each run, a sheet-like mesh structure was produced by the same operation as in Example 1-(A) using "Hytrel 4056 ®" as an elastomeric polymer. A composite was prepared from the sheet-like mesh structure by the same operation as in Example 1-(B) using various fibrous structures. The properties are shown in Table 4.

TABLE 4

| Example | | 11 | 12 |
|---|---|---|---|
| Sheet-like mesh Structure (A) | Method | BF method | |
| | Fiber density (number) | 18 | |
| | Elastic recovery ratio | MD  TD | |
| | (at 10% stretch) (%) | 90  88 | " |
| | Stress (at 10% stretch) | 55  65 | |
| | Drape factor (%) | 35 | |
| | Drape stiffness (cm) | 1.6 | |
| | Thickness ($\mu$) | 80-100 | |
| | Weight (g/m$^2$) | 31.5 | |
| Fibrous structure (B) | Material | Web of nylon 6 staples | Cotton web |
| | Single fiber denier | 1.5 | — |
| | Fiber length | 38 mm | 1.1/16 inch |
| | Number of crimps per inch | 13.5 | — |
| | Weight (g/m$^2$) | 90 | 90 |
| Method of bonding Composite | Method | Needle-punching | " |
| | Needle density per cm$^2$ | 50 | |
| | Bulk density (g/cm$^3$) | 0.07 | 0.04 |
| | Thickness ($\mu$) | about 2000 | about 2000 |
| | Elastic recovery ratio | MD  TD | MD  TD |
| | (at 10% stretch) (%) | 86  82 | 85  81 |
| | Stress (at 10% stretch) | 59  75 | 60  74 |
| | Flexibility (%) | 73 | 65 |
| | Air permeation resistance (cm/aq.) | 3.6 | 4.0 |

| Example | | 13 | 14 |
|---|---|---|---|
| Sheet-like mesh structure (A) | Method | BF method | |
| | Fiber density (number) | 18 | |
| | Elastic recovery ratio | MD  TD | |
| | (at 10% stretch) (%) | 90  88 | |
| | Stress (at 10% stretch) | 55  65 | " |
| | Drape factor (%) | 35 | |
| | Drape stiffness | 1.6 | |
| | Thickness ($\mu$) | 80-100 | |
| | Weight (g/m$^2$) | 31.5 | |
| Fibrous structure (B) | Material | Web of PET staples | Web of polyvinyl alcohol staples |
| | Single fiber denier | 1.5 | 1.6 |
| | Fiber length (mm) | 38 | 64 |
| | Number of crimps per inch | 11.5 | 12 |
| | Weight (g/m$^2$) | 90 | 90 |
| Method of bonding composite | Method | Needle-punching | " |
| | Needle density per cm$^2$ | 50 | |
| | Bulk density (g/cm$^3$) | 0.07 | 0.035 |
| | Thickness ($\mu$) | about 2000 | about 3500 |
| | Elastic recovery ratio | MD  TD | MD  TD |
| | (at 10% stretch) (%) | 85  80 | 84  80 |
| | Stress (at 10% stretch) | 58  70 | 60  73 |
| | Flexibility (%) | 65 | 68 |
| | Air permeation resistance (cm/aq.) | 3.5 | 3.1 |

(Note)
MD: machine direction;
TD: transverse direction.

EXAMPLE 15

As a fibrous structure (B), a long fiber web obtained by the following procedure was used.

An apparatus including two vent-type extruders A and B and a polymer stream associating chamber was used. A mixture of 30% of isotactic polypropylene (S-115M, a product of Ube Industries, Ltd.) and 70% of nylon 6 (T-100, a product of Teijin Limited) was fed into extruder A and N$_2$ gas was introduced from the vent portion. In the meantime, a mixture of 80% of polyester elastomer (Hytrel 4056®, a product of du Pont) and 20% of polypropylene was fed into extruder B and N$_2$ gas was introduced from the vent portion. The extruding temperature was 230° to 290° C. The polymer mixture in the extruder A containing about 0.1% by weight of N$_2$ gas and the polymer mixture in the extruder B containing about 0.1% by weight of N$_2$ gas were led to the polymer stream associating chamber. The associated molten polymer was extruded from a circular die having a long diameter of 220 mm and a slit clearance of 0.1 mm at an extruding temperature of 230° to 290° C. The extruded fiber assembly was wound up at a draft ratio of 160 while it was cooled with air at a point within 3 mm to 5 mm from the slit surface.

Three hundred such fiber assemblies were laminated, and extended to 10 times in the widthwise direction at an overfeed ratio of 2, and then passed through a crimping zone kept at 150° to 165° C. for 30 seconds to form a crimped long fiber web.

The resulting long fiber web was laminated to a sheet-like mesh structure produced in the same way as in Example 1, (1) using "Hytrel 4056®" as an elastomeric polymer. The laminate was needle-punched at a needle penetration density of 20/cm$^2$ to form a composite. The various properties are shown below.

(1) Sheet-like mesh structure

Same as the properties shown in Example 4.

(2) Fibrous structure

1. Material: polypropylene/nylon 6 (30/70), Hytrel 4056®/polypropylene (80/20).
2. Average fiber denier: 1.5 denier
3. Number of crimps: 200/inch
4. Basis weight: 85 g/m$^2$ (3) Composite 1. Bulk density: 0.03
2. Thickness: about 5,000 microns
3. Elastic recovery ratio: 80 (MD), 75 (TD)
4. Stress: 85 (MD), 100 (TD)
5. Flexibility: 70
6. Air permeation resistance: 5.5 cm/aq.

EXAMPLE 16

A sheet-like mesh structure (A) was produced by the same procedure as in Example 1, (1) using Hytrel 4056® as an elastomeric polymer.

A fiber assembly of polypropylene/nylon 6 (70/30) having an average single fiber denier size of 1.5 denier and a fiber assembly of polyethylene/polypropylene (50/50) having an average single fiber denier size of 2.0 denier were produced by the BF method. Four hundred such fiber assemblies (in total) were laminated alternately to each other, and the laminate was extended to 10 times in the widthwise direction at an overfeed ratio of 2, and passed through a crimping zone at 110° C. for 30 seconds to obtain a crimped long fiber web.

The resulting fibrous structure was bonded to the sheet-like mesh structure (A) by a needle-punching method at a needle penetrating density of 20/cm$^2$ to form an elastic composite.

The various properties are shown below.

(1) Sheet-like mesh structure

Same as the properties in Example 4.

(2) Fibrous structure

1. Material: polypropylene/nylon 6 (70/30), polyethylene/polypropylene (50/50)
2. Average fiber denier size: 1.5 to 2.0 denier 3. Number of crimps: 50/inch
4. Basis weight: 80 g/m²

(3) Composite

1. Bulk density: 0.06
2. Thickness: about 2,000 microns
3. Elastic recovery ratio: 80 (MD), 76 (TD)
4. Stress: 78 (MD), 95 (TD)
5. Flexibility: 68
6. Air permeation resistance: 54

What we claim is:

1. A fibrous composite comprising a coalesced assembly of
   (A) a sheet-like mesh structure composed of fibers of a synthetic elastomeric polymer, the individual fibers being interconnected in irregular spaced-apart relationships thereby forming a number of meshes of different shapes and sizes, said mesh structure having
       (1) a recovery ratio after 10% stretch of at least 70% in two arbitrarily selected, mutually perpendicular directions on the plane of said mesh structure;
       (2) a weight of 10 to 100 g/m²; and
       (3) a fiber density (Fd) of 3 to 100, in which the fiber density (Fd) is calculated in accordance with the following equation:

$$Fd = \tfrac{1}{2}(a+b) \tag{1}$$

wherein a is the number of fibers which cross a straight line formed by connecting two arbitrary points 2 mm apart from each other on the plane of the sheet-like mesh structure (A), and b is the number of fibers which cross a straight line formed by connecting two arbitrary points 2 mm apart from each other on a straight line at right angles to the straight line referred to above with regard to the number of fibers (a); and
   (B) a mat-, web- or sheet-like fibrous structure composed of short or long fibers, said fibrous structure having a recovery ratio after 10% stretch of less than 50% in at least one arbitrarily selected direction.

2. The fibrous composite of claim 1 wherein said sheet-like mesh structure (A) has a stress of 5 to 1,000 g at 10% stretch when it is measured on a test sample, 2.5 cm wide, taken in an arbitrarily selected direction on the plane of the mesh structure (A).

3. The fibrous composite of claim 1 wherein said sheet-like mesh structure (A) has a stress of 10 to 500 g at 10% stretch when it is measured on a test sample, 2.5 cm wide, taken in an arbitrarily selected direction on the plane of the mesh structure (A).

4. The fibrous composite of claim 1 wherein said sheet-like mesh structure (A) has a recovery ratio after 10% stretch of at least 80% in two arbitrarily selected, mutually perpendicular directions on the plane of said mesh structure (A).

5. The fibrous composite of any one of claim 1 wherein the sheet-like mesh structure (A) has a weight of 10 to 100 g/m².

6. The fibrous composite of claim 1 wherein said fibrous structure (B) has a bulk density of not more than 0.7.

7. The fibrous composite of claim 1 wherein said fibrous structure (B) has an individual fiber denier size of not more than 30 denier.

8. The fibrous composite of claim 1 wherein said fibrous structure (B) has a thickness of 0.5 to 50 mm.

9. The fibrous composite of claim 1 wherein said fibrous structure (B) is an assembly of short fibers having a length of 10 to 150 mm.

10. The fibrous composite of claim 1 wherein said sheet-like mesh structure (A) and said fibrous structure (B) are coalesced with each other by needle-punching.

* * * * *